(12) United States Patent
Maruyama et al.

(10) Patent No.: US 7,539,108 B2
(45) Date of Patent: May 26, 2009

(54) OPTICAL INFORMATION REPRODUCTION APPARATUS AND OPTICAL INFORMATION REPRODUCTION METHOD

(75) Inventors: Tsutomu Maruyama, Chiba (JP); Isao Ichimura, Tokyo (JP)

(73) Assignee: Sony Corporation (JP)

( * ) Notice: Subject to any disclaimer, the term of this patent is extended or adjusted under 35 U.S.C. 154(b) by 632 days.

(21) Appl. No.: 11/250,481

(22) Filed: Oct. 17, 2005

(65) Prior Publication Data
US 2006/0087937 A1    Apr. 27, 2006

(30) Foreign Application Priority Data
Oct. 25, 2004  (JP) ............................ P2004-309956

(51) Int. Cl.
G11B 7/00    (2006.01)
(52) U.S. Cl. ................. 369/53.35; 369/124.11
(58) Field of Classification Search ............... None
See application file for complete search history.

(56) References Cited

U.S. PATENT DOCUMENTS

| | | | | |
|---|---|---|---|---|
| 5,265,125 A | * | 11/1993 | Ohta | 375/229 |
| 6,477,125 B1 | * | 11/2002 | Hayami | 369/59.22 |
| 6,842,410 B1 | * | 1/2005 | Spielman et al. | 369/47.27 |
| 7,020,062 B2 | * | 3/2006 | Kuroda et al. | 369/53.34 |
| 7,193,955 B2 | * | 3/2007 | Ito et al. | 369/112.12 |
| 2002/0150005 A1 | * | 10/2002 | Nishiuchi | 369/44.29 |

FOREIGN PATENT DOCUMENTS

JP    2002-025098    1/2002

* cited by examiner

*Primary Examiner*—Peter Vincent Agustin
(74) *Attorney, Agent, or Firm*—Rader Fishman & Grauer PLLC; Ronald P. Kananen

(57) ABSTRACT

An optical information reproduction apparatus for reproducing a recording signal by irradiating a light beam onto a recording surface of an optical information recording medium having at least two information recording layers and by receiving reflected light of the light beam is provided. The optical information reproduction apparatus includes an extraction section for extracting an envelope signal of a reproduction signal when the reproduction signal reproduced by focusing the light beam onto one information recording layer in the plural information recording layers has been modulated by interlayer crosstalk from another information recording layer; and a distortion correction section for correcting the distortion of the target reproduction signal caused by the interlayer crosstalk by gain-adjusting the reproduction signal containing DC components so that the envelope signal becomes constant.

4 Claims, 5 Drawing Sheets

OPTICAL INFORMATION REPRODUCTION APPARATUS AND OPTICAL INFORMATION REPRODUCTION METHOD

CROSS REFERENCES TO RELATED APPLICATIONS

The present invention contains subject matter related to Japanese Patent Application JP 2004-309956 filed in the Japanese Patent Office on Oct. 25, 2004, the entire contents of which are incorporated herein by reference.

BACKGROUND OF THE INVENTION

1. Field of the Invention

The present invention relates to an optical information reproduction apparatus and an optical information reproduction method, and it is suitable for use in, for example, an optical information recording and reproduction apparatus for recording and reproducing information on an optical disc having plural information recording layers.

2. Description of the Related Art

In recent years, in optical information recording and reproduction apparatuses for recording and reproducing information on a recording medium such as an optical disc, a technique for making recording information into a higher density by a shortening of the wavelength of a light source and by a higher aperture number of an objective lens has been proposed. For example, a two-layer disc having a recording capacity exceeding 23 Gbytes per layer as a result of using an objective lens with the aperture number 0.85 and a bluish purple semiconductor laser of a wavelength 405 [nm] has been standardized as a "Blu-ray Disc (trademark)". Furthermore, in recent years, as the density of recording information becomes higher, a lot has been reported about multilayer optical discs for optically reading, from one side, recording information layers that are formed in plural layers.

When the recording information of a particular information recording layer Ln within such a multilayer optical disc is reproduced, if the distance between adjacent layers is sufficiently large, influences due to the leakage of signals (hereinafter, referred to as "interlayer crosstalk") from a plurality of information recording layers other than the information recording layer Ln are small, and the reproduction characteristics of a RF signal does not particularly pose a problem.

The smaller the interlayer distance, the larger the interlayer crosstalk, and the RF signal is deteriorated. The smaller interlayer distance is caused by a limitation of the distance from the disc surface to each information recording layer due to the number of layers of a multilayer optical disc, the correction range of an expander for correcting spherical aberration caused by the difference in the distance from the disc surface to each information recording layer by a higher aperture number of an objective lens, an inclination margin between the objective lens and the disc, and defects such as scratches and fingerprints.

As a technique for reducing such interlayer crosstalk, there is a known pickup device in which the standardized detector size of an optical detector is optimized (refer to, for example, Japanese Unexamined Patent Application Publication No. 2002-25098).

SUMMARY OF THE INVENTION

In a pickup device having such a configuration, in order that the stability of a focus servo and the mounting accuracy and reliability of an optical detector do not deteriorate, it is difficult to reduce the standardized detector size to less than a particular degree. As a result, when the layer spacing is narrow to such a degree of approximately 10 [μm] to 20 [μm], the RF signal is modulated by interlayer crosstalk, and distortion is caused to occur. Thus, there is a problem in that, when a binarization is performed on the basis of the RF signal in which the distortion occurred, it is difficult to correctly reconstruct the reproduction result.

The present invention has been made in view of the above points. It is desirable to provide an optical information reproduction apparatus that obtains an accurate reproduction result by removing in advance the distortion caused by interlayer crosstalk of a reproduction signal when information on an optical information recording medium having plural information recording layers is reproduced.

According to an embodiment of the present invention, in an optical information reproduction apparatus for reproducing a recording signal by irradiating a light beam onto a recording surface of an optical information recording medium having at least two information recording layers and by receiving reflected light of the light beam, an envelope signal of a reproduction signal is extracted when the reproduction signal reproduced by focusing the light beam onto one information recording layer in plural information recording layers has been modulated by interlayer crosstalk from another information recording layer, and the distortion of the target reproduction signal by the interlayer crosstalk is corrected by gain-adjusting the reproduction signal containing DC components so that the envelope signal becomes constant. Thus, even when the influence of distortion due to interlayer crosstalk appears in the reproduction signal from the optical information recording medium having plural information recording layers, the influence of the distortion can be prevented, and the reproduction result can be reconstructed without errors on the basis of a reproduction signal before the influence due to the interlayer crosstalk is received.

In an embodiment of the present invention, the optical information reproduction apparatus further includes determination means for determining whether the optical information recording medium has plural information recording layers or a single information recording layer on the basis of a reading from the information recording layer and control means for allowing extraction means and distortion correction means to operate when it is determined by the determination means that the optical information recording medium has plural information recording layers and for otherwise allowing signal processing means to perform signal processing without allowing the extraction means and the distortion correction means to operate. Thus, only when the optical information recording medium has plural information recording layers, the influence of distortion due to interlayer crosstalk can be removed, and a useless operation for removing the influence of distortion due to interlayer crosstalk even when the optical information recording medium has a single information recording layer can be prevented from being performed.

According to the embodiments of the present invention, it is possible to realize an optical information reproduction apparatus and an optical information reproduction method which can remove the influence of distortion even when the influence of distortion due to interlayer crosstalk appears in the reproduction signal from the optical information recording medium having plural information recording layers which can reconstruct a reproduction result without errors on the basis of a reproduction signal before the influence due to the interlayer crosstalk is received.

DESCRIPTION OF THE PREFERRED EMBODIMENTS

An embodiment of the present invention will now be described in detail below with reference to the drawings.

(1) Configuration of Optical Pickup

Figure 1:
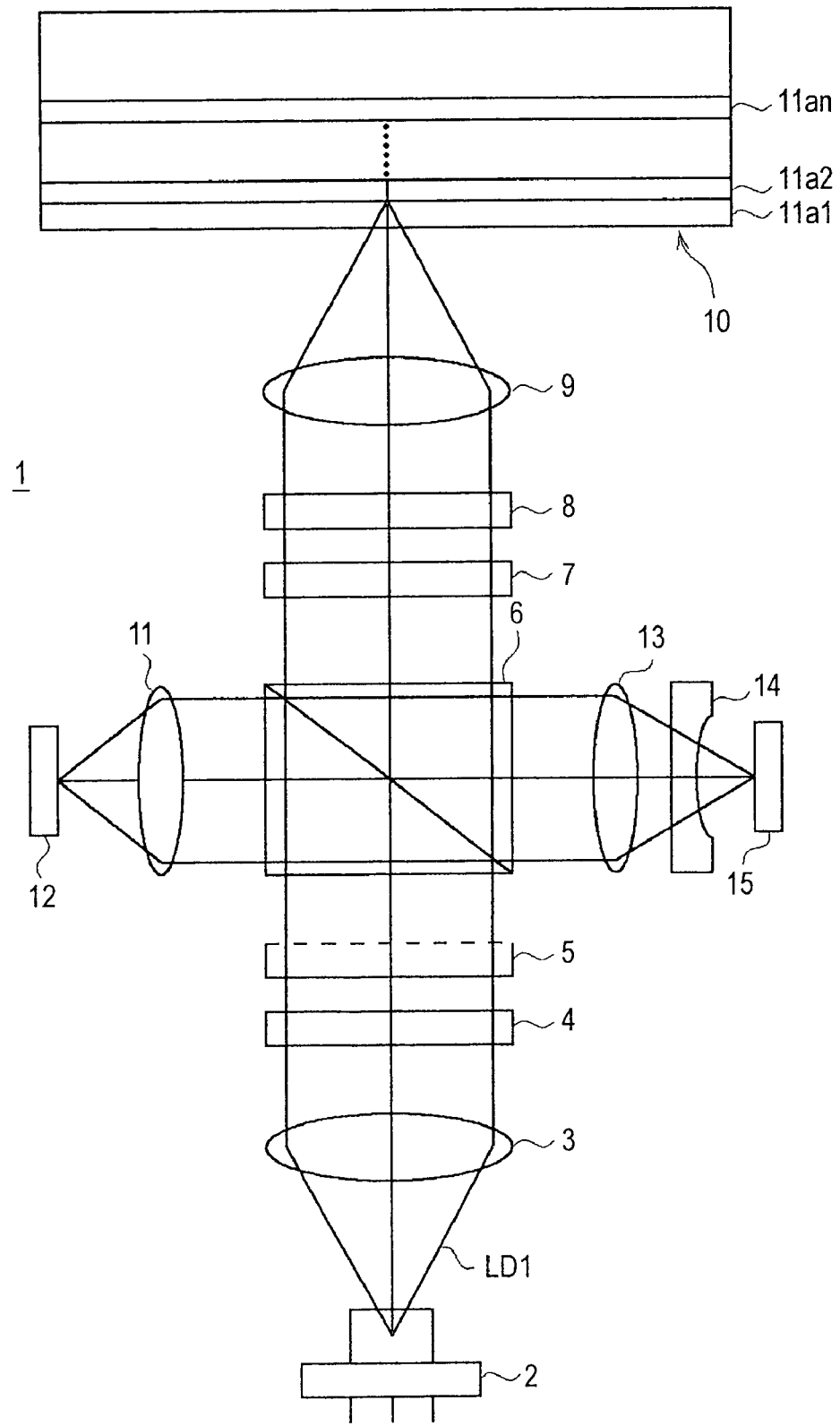
FIG. 1 is a schematic diagram showing the configuration of an optical pickup.

In FIG. 1, reference numeral 1 denotes an optical pickup as a whole. The optical pickup 1 converts light LD1 emitted from a semiconductor laser diode 2 into parallel light by a collimator lens 3, causes the parallel light to pass through a ½ wavelength plate 4, causes it to pass through a diffraction grating 5 for generating a side spot used to compute a tracking control error signal, and thereafter separates it into transmitted light and reflected light by a polarized light beam splitter 6. This spectral ratio can be adjusted by rotating the ½ wavelength plate 4.

The light transmitted through the polarized light beam splitter 6 passes through a wavefront conversion element 7, which is formed of an expander or a liquid-crystal optical element, for correcting spherical aberration caused by a thickness error of a cover layer 11a1 and cover layers 11a2 to 11an from the disc surface of an optical disc 10 to an information recording layer, passes through a ¼ wavelength plate 8 for converting linearly-polarized light into circularly-polarized light, and thereafter is collected onto the optical disc 10 by a high-aperture-number objective lens 9.

The light reflected by the polarized light beam splitter 6 is guided to a light-receiving element 12 for detecting emission light output by the light-collecting lens 11, and the detection result of the light-receiving element 12 for detecting emission light output is used to control the laser power of the emitting light LD1 from the semiconductor laser diode 2.

On the other hand, the reflected light from the optical disc 10 passes through the high-aperture-number objective lens 9, the ¼ wavelength plate 8, and the wavefront conversion element 7, and is reflected by the polarized light beam splitter 6. Thereafter, the light is guided to the detection light path. In this case, an astigmatism method is used as a focus error control method, and also, a differential push-pull method is used as a tracking error control method. The converging light that has passed through a light-collecting lens 13 and a multi-lens 14 enters a light-receiving element 15 for detecting a servo error signal and a RF signal, whereby it is photoelectrically converted.

The light-receiving element 15 for detecting a servo error signal and a RF signal outputs the light-receiving signal obtained by photoelectrically converting the converging light into a circuit at a subsequent stage. Here, the light-receiving surface of a main beam within the light-receiving element 15 for detecting a servo error signal and a RF signal is formed of a four-division optical detector.

(2) Configuration of Optical Information Recording and Reproduction Apparatus

Figure 2:
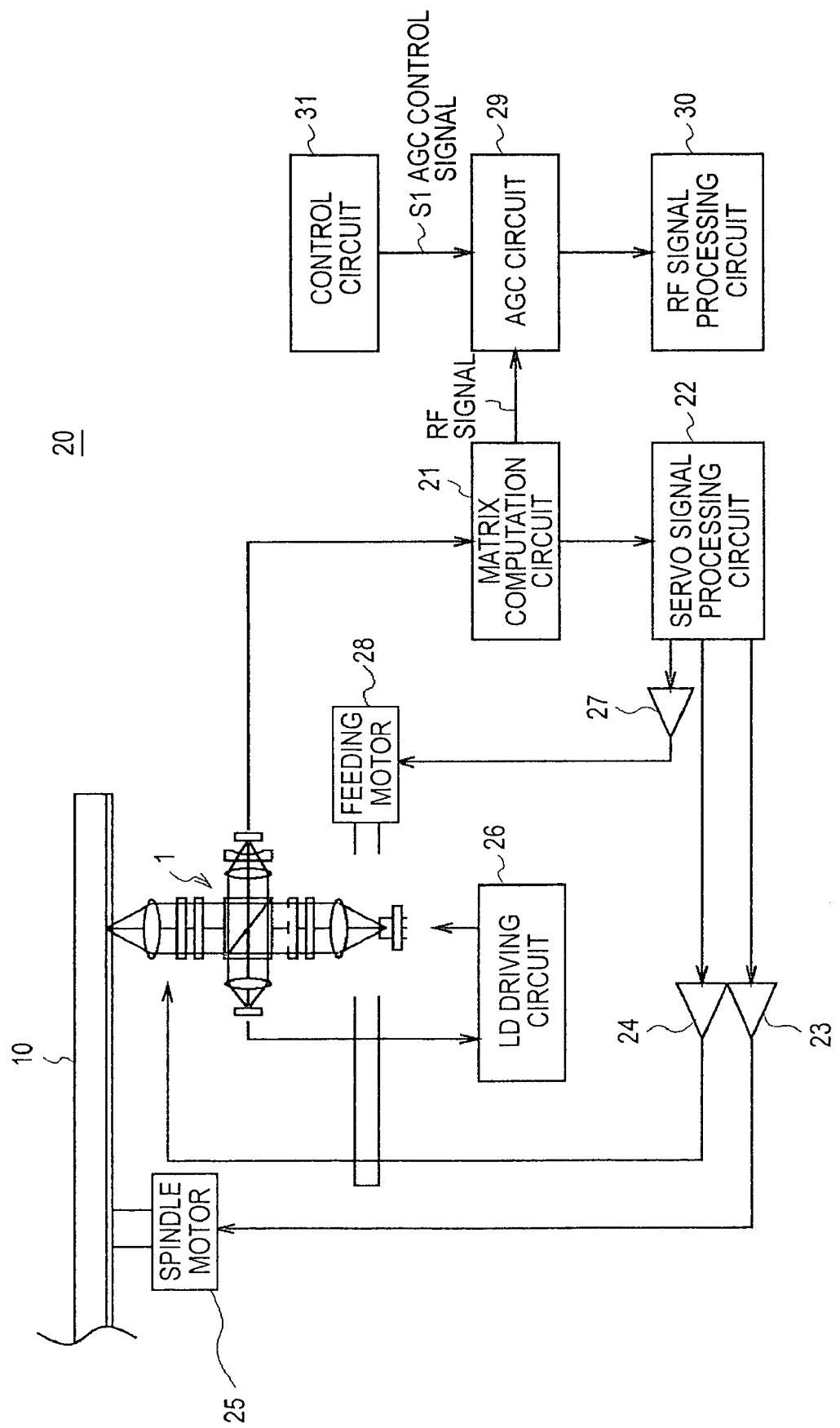
FIG. 2 is a schematic block diagram showing the circuit configuration of an optical information recording and reproduction apparatus.

As shown in FIG. 2, an optical information recording and reproduction apparatus 20, which uses the optical pickup 1 shown in FIG. 1, performs a computation process using a matrix computation circuit 21 on the basis of a light-receiving signal read from the optical disc 10 by the optical pickup 1, in order to generate a focus control error signal, a tracking control error signal, a spherical aberration control error signal, and a RF signal for signal processing, and sends the focus control error signal, the tracking control error signal, the spherical aberration control error signal, and the RF signal for signal processing to a servo signal processing circuit 22.

In the servo signal processing circuit 22, gain adjustment and phase compensation are performed. Thereafter, by controlling the rotational speed of a spindle motor 25 via a spindle motor control circuit 23 and by controlling an actuator (not shown) via an actuator/spherical aberration control circuit 24, focus control, spherical aberration control, and tracking control of the optical pickup 1 are performed.

In the servo signal processing circuit 22, feeding control in the radial direction with respect to the optical pickup 1 is performed by controlling a motor 28 via a feeding motor control circuit 27 by using low-frequency components of the tracking control error signal.

On the other hand, the RF signal for signal processing generated by the matrix computation circuit 21 is input to an AGC (Automatic Gain Control) circuit 29 (to be described later), distortion due to interlayer crosstalk is corrected by the AGC circuit 29, and the RF signal is sent to a RF signal processing circuit 30.

In the RF signal processing circuit 30, the reproduction result is reconstructed accurately by performing waveform equalization, a PRML (Partial Response Maximum Likelihood) signal process, and a correction process, etc., on the RF signal from which distortion due to interlayer crosstalk is removed.

In a LD (Laser Diode) driving circuit 26 of the optical information recording and reproduction apparatus 20, by controlling the emitting power of the optical pickup 1 on the basis of the detection result obtained from the light-receiving element 12 (FIG. 1) for detecting emission light output of the optical pickup 1, the emitting light LD1 is set at the optimum laser power.

(3) Principles for Removing Distortion Due to Interlayer Crosstalk

For the RF signal, for example, in the case of a 17PP modulation method, it is formed of marks and spaces whose run length is 2 T to 8 T (T is the channel bit clock width, and 9 T also exists but is very little). When the optical disc 10 is a multilayer optical disc and the RF signal is affected by interlayer crosstalk, as shown in part (A) of FIG. 3, the amplitude of the RF signal varies, and a state is reached in which distortion such that the envelope signal fluctuates is contained.

Within the RF signal, the signal of 8 T components whose mark and space lengths are long is low in frequency and large in amplitude, whereas the signal of 2 T components whose mark and space lengths are short is high in frequency and small in amplitude due to MTF (Modulation Transfer Function) characteristics. Although the RF signal contains signals of 8 T components and 2 T components, and also 3 T components, 4 T components, . . . 9T components, for the sake of simplicity of description, only the signal of 8T components and 2 T components is described below. The waveforms of 8

Figure 3:
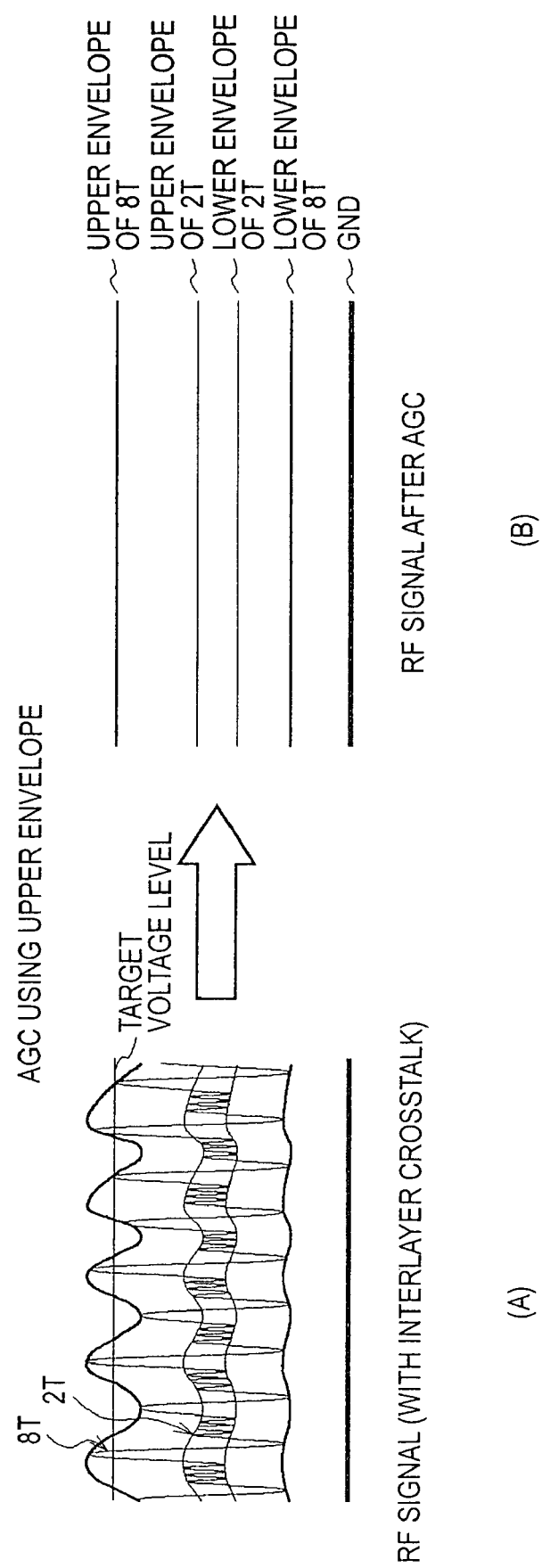
FIG. 3 is a schematic diagram illustrating AGC with respect to RF signal containing DC components.

T components and 2 T components in part (a) of FIG. 3 differ from the actual scale, and they are shown only schematically.

Therefore, when the RF signal in which distortion due to interlayer crosstalk exists is binarized by the RF signal processing circuit 30 (FIG. 2), the amplitude of the RF signal is varied and the envelope fluctuates. In consequence, jitter of the RF signal (fluctuation of signal over time) becomes large, and erroneous detection becomes frequent.

In the AGC circuit 29, in order to prevent such a situation, the gain adjustment of the RF signal is performed in such a manner as to correspond to an AGC control signal S1 from the control circuit 31, so that the fluctuation that has occurred in the envelope (in particular, the upper envelope of 8 T) as shown in part (B) of FIG. 3 is removed and the envelope can be kept constant.

In this case, the band of the RF signal is sufficiently higher than the band of the distortion components of the envelope due to interlayer crosstalk. Thus, in the AGC circuit 29, gain adjustment is performed in the band of the envelope, so that the envelope can be kept constant by removing the distortion thereof without directly affecting the RF signal containing 8 T components and 2 T components.

Here, the AGC circuit 29 is designed to adjust the amplitude level of the RF signal in a state in which DC (Direct Current) components are kept so as to be contained in the RF signal. Alternatively, it is considered that the amplitude level is adjusted with respect to the RF signal after so-called AC (Alternating Current) coupling for removing DC components is performed.

Figure 4:
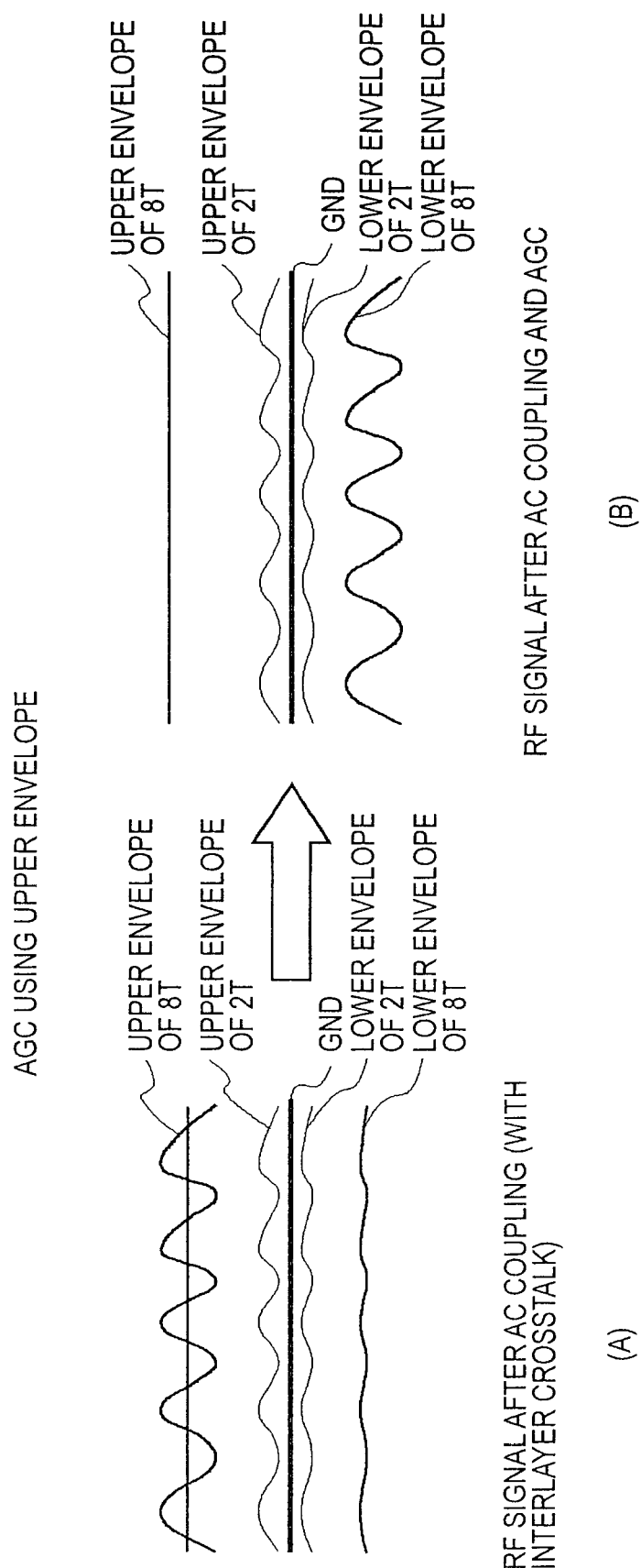
FIG. 4 is a schematic diagram illustrating AGC with respect to RF signal after AC coupling.

The reasons why the amplitude level is adjusted with respect to the RF signal containing DC components without performing AC coupling in the embodiment of the present invention are the following. Since the signal of 2 T components in the vicinity of the ground (GND) level when AC coupling is performed as shown in parts (A) and (B) of FIG. 4 has a value in the vicinity of nearly the 0 level, it is difficult to sufficiently increase the gain thereof in comparison with the signal of 8 T components, for example, even if gain adjustment is performed onto the signal of 2 T components and the signal of 8 T components at the same magnification ratio. Also, on the minus side relative to the ground, conversely, the distortion due to interlayer crosstalk is increased by the gain adjustment on the lower envelope in the signal of 8T components. By also taking such points into consideration, in the AGC circuit 29 according to the embodiment of the present invention, gain adjustment is performed on the RF signal containing DC components.

The control circuit 31 (FIG. 2) makes a determination as to whether the optical disc 10 is a single-layer optical disc or a multilayer optical disc during focus search on the optical disc 10 and when disc information is read during data writing, and it outputs the AGC control signal S1 to the AGC circuit 29 only when the optical disc 10 is a multilayer optical disc, thereby removing distortion of the RF signal due to interlayer crosstalk.

When the optical disc 10 is a single-layer optical disc, since the RF signal does not deteriorate due to interlayer crosstalk, in the AGC circuit 29, the distortion due to interlayer crosstalk is removed only when the AGC control signal S1 is supplied from the control circuit 31.

(4) Configuration of AGC Circuit

Figure 5:
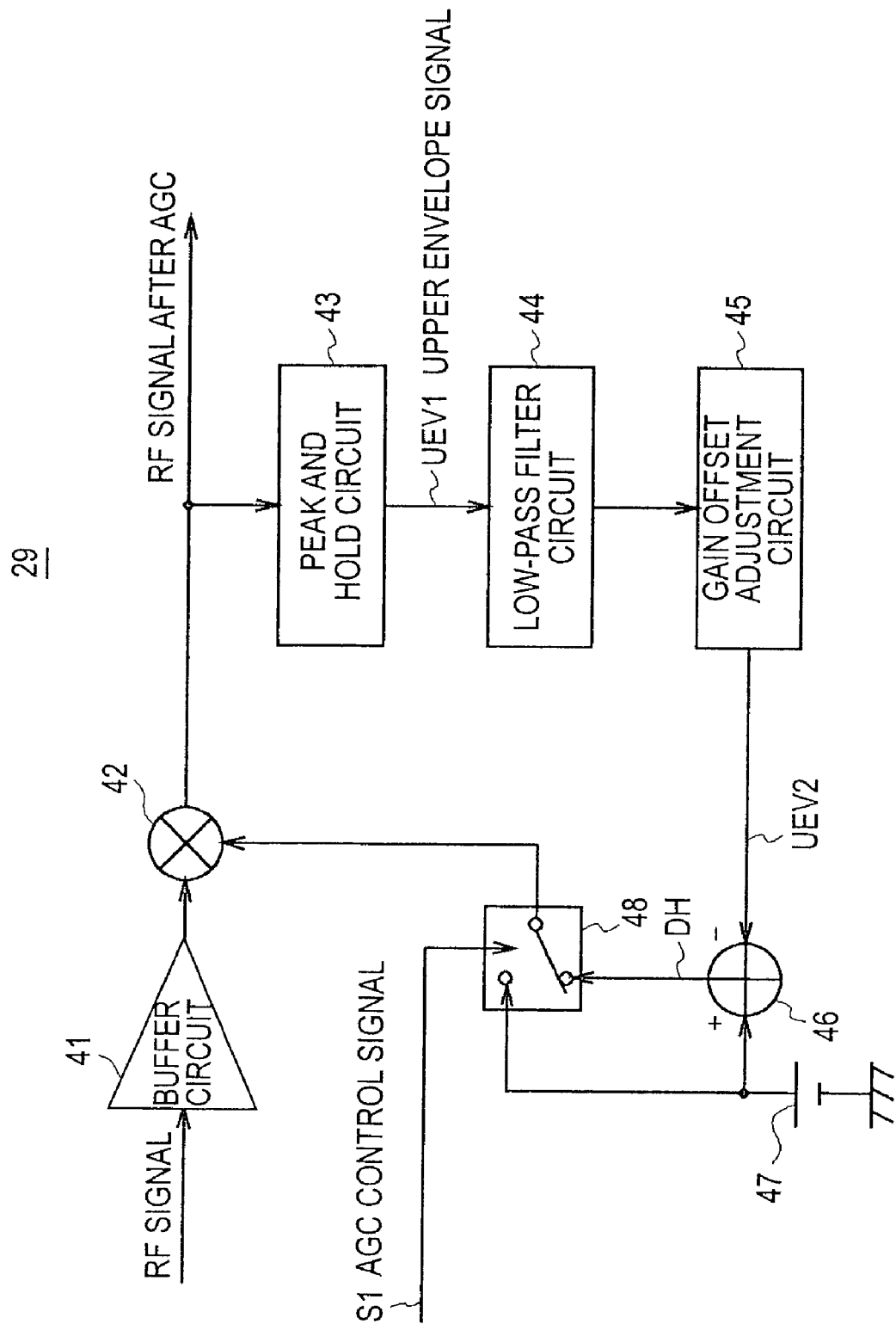
FIG. 5 is a schematic block diagram showing the configuration of an AGC circuit.

In practice, as shown in FIG. 5, the AGC circuit 29 sends the RF signal containing DC components, which is supplied from the matrix computation circuit 21, to a peak-hold circuit 43 via a buffer circuit 41 and a multiplier 42.

The peak-hold circuit 43 extracts an upper envelope signal UEV 1 of the RF signal by peak-holding the RF signal containing DC components in the band between DC and several hundred [KHz] and sends the upper envelope signal UEV 1 to a low-pass filter circuit 44.

The low-pass filter circuit 44 allows only the upper envelope signal UEV 1 of the RF signal extracted by the peak-hold circuit 43 within the RF signal to pass and sends this signal to a gain offset adjustment circuit 45.

The gain offset adjustment circuit 45 performs the adjustment of the loop gain and offset of AGC and sends an upper envelope signal UEV 2 obtained thereby after adjustment to an adder 46.

In the adder 46, the difference between the target voltage level supplied from a RF amplitude adjustment voltage 47 and the voltage level of the upper envelope signal UEV 2 is computed, and the resultant computation result DH is supplied to the multiplier 42 via an AGC switching circuit 48.

Here, for the RF amplitude adjustment voltage 47, for example, the target voltage level is set at substantially an intermediate voltage between a relative maximum value and a relative minimum value in the upper envelope signal UEV 2 of 8 T components (FIG. 3). Alternatively, the target voltage level may be set to any desired voltage corresponding to a relative maximum value and any desired voltage corresponding to a relative minimum value.

The AGC switching circuit 48 outputs the computation result DH from the adder 46 to the multiplier 42 only when the AGC control signal S1 is supplied from the control circuit 31 (FIG. 2), and it is switched by a switch so that the computation result DH is not output to the multiplier 42 when the AGC control signal S1 is not supplied.

In the multiplier 42, the RF signal containing DC components from the buffer circuit 41 is multiplied by the computation result DH supplied from the AGC switching circuit 48, so that the fluctuation of the envelope of the RF signal receiving distortion due to interlayer crosstalk is eliminated and the envelope is corrected to a fixed level.

That is, in the RF signal that is finally output from the multiplier 42, the influence of the distortion due to interlayer crosstalk does not remain, so that erroneous reading of the signal is prevented when the RF signal is binarized by the RF signal processing circuit 30 at a subsequent stage.

(5) Operation and Advantages

In the above construction, even when the RF signal fluctuates by being affected by the interlayer crosstalk, the AGC circuit 29 of the optical information recording and reproduction apparatus 20 can eliminate the fluctuation that has occurred in the RF signal by applying AGC to the RF signal containing DC components, and the envelope of the RF signal can be kept constant.

At this time, the AGC circuit 29 performs gain adjustment so that the upper envelope of 8 T components in the RF signal containing DC components becomes constant on the plus side with reference to the ground. As a result, the upper envelope of 2 T components, the lower envelope of 2 T components, and the lower envelope of 8 T components are made to follow the upper envelope of 8T components so that all the envelopes of 8 T components and 2 T components can be kept constant.

In the AGC circuit 29, AGC is applied in the frequency band of the distortion components due to interlayer crosstalk of the upper envelope signal of 8 T components in the RF signal. As a result, direct influences are not exerted on the RF signal in a frequency band far higher than the frequency band of the distortion components due to interlayer crosstalk of the upper envelope signal.

Therefore, in the optical information recording and reproduction apparatus 20, since the signal can be binarized by the AGC circuit 29 on the basis of the RF signal in which influences due to interlayer crosstalk are eliminated, the reproduction result can be accurately reconstructed.

According to the above construction, by applying AGC to the RF signal containing DC components, the envelope of the RF signal becomes constant to eliminate distortion due to interlayer crosstalk in advance, and the reproduction result can be accurately reconstructed on the basis of a RF signal in which the distortion is eliminated.

(6) Other Embodiments

Although the above embodiment describes a case in which the AGC circuit 29 is provided between the matrix computation circuit 21 and the RF signal processing circuit 30, the present invention is not limited to this embodiment, and the AGC circuit 29 may be provided between the matrix computation circuit 21 and the servo signal processing circuit 22. As a result, in the optical information recording and reproduction apparatus 20, servo control can be performed accurately.

Although the above embodiment describes a case in which the upper envelope signal UEV 1 is extracted on the basis of the peak level of the 8 T components of the RF signal by the peak-hold circuit 43 of the AGC circuit 29 and gain adjustment is performed on the upper envelope signal UEV 1, the present invention is not limited to this embodiment. In addition, the lower envelope signal may be extracted on the basis of the bottom level, and gain adjustment may be performed on the RF signal on the basis of the lower envelope signal.

Although the above embodiment describes a case in which the AGC circuit 29 according to the embodiment of the present invention is incorporated in the optical information recording and reproduction apparatus 20, the present invention is not limited to this embodiment. In addition, the AGC circuit 29 according to the embodiment of the present invention may be incorporated in a read-only optical information reproduction apparatus.

Although the above embodiment describes a case in which the optical information recording and reproduction apparatus 20 serving as an optical information reproduction apparatus is formed of the peak-hold circuit 43 serving as extraction means, the gain offset adjustment circuit 45 serving as distortion correction means, the adder 46, the RF amplitude adjustment voltage 47, and the multiplier 42, the present invention is not limited to this embodiment. In addition, the optical information reproduction apparatus may be formed of other various types of circuit configurations.

The optical information reproduction apparatus and the optical information reproduction method according to the embodiments of the present invention can be applied to various uses in which, for example, when influences of interlayer crosstalk occur in the reproduction signal of the multilayer optical disc, the influences are eliminated and reproduction is performed accurately.

It should be understood by those skilled in the art that various modifications, combinations, subcombinations and alterations may occur depending on design requirements and other factors insofar as they are within the scope of the appended claims or the equivalents thereof.

What is claimed is:

1. An optical information reproduction apparatus for reproducing a recording signal by irradiating a light beam onto a recording surface of an optical information recording medium having at least two information recording layers and by receiving reflected light of the light beam, the optical information reproduction apparatus comprising:

extraction means for extracting an envelope signal of a reproduction signal when the reproduction signal reproduced by focusing the light beam onto one information recording layer in the plural information recording layers has been modulated by interlayer crosstalk from another information recording layer;

distortion correction means for correcting the distortion of the target reproduction signal caused by the interlayer crosstalk by gain-adjusting the reproduction signal containing DC components so that the envelope signal becomes constant;

determination means for determining whether the optical information recording medium has plural information recording layers or a single information recording layer on the basis of a reading from the information recording layer; and control means for allowing the extraction means and the distortion correction means to operate when it is determined by the determination means that the optical information recording medium has plural information recording layers and for otherwise allowing signal processing means to perform signal processing without allowing the extraction means and the distortion correction means to operate.

2. The optical information reproduction apparatus according to claim 1, further comprising signal processing means for obtaining a reproduction result by performing signal detection on the basis of a reproduction signal after distortion caused by the interlayer crosstalk is corrected by the distortion correction means.

3. An optical information reproduction method for reproducing a recording signal by irradiating a light beam onto a recording surface of an optical information recording medium having at least two information recording layers and by receiving reflected light of the light beam, the information reproduction method comprising the steps of:

extracting an envelope signal of a reproduction signal when the reproduction signal reproduced by focusing the light beam onto one information recording layer in the plural information recording layers has been modulated by interlayer crosstalk from another information recording layer;

correcting the distortion of the target reproduction signal by the interlayer crosstalk by gain-adjusting the reproduction signal containing DC components so that the envelope signal becomes constants;

determining whether the optical information recording medium has plural information recording layers or a single information recording layer on the basis of a reading from the information recording layer; and allowing the extraction of said envelope signal and correction of said distortion when it is determined that the optical information recording medium has plural information recording layers and otherwise allowing signal processing without allowing the extraction of said envelope signal and correction of said distortion.

4. An optical information reproduction apparatus for reproducing a recording signal by irradiating a light beam onto a recording surface of an optical information recording medium having at least two information recording layers and by receiving reflected light of the light beam, the optical information reproduction apparatus comprising:

an extraction section extracting an envelope signal of a reproduction signal when the reproduction signal reproduced by focusing the light beam onto one information recording layer in the plural information recording layers has been modulated by interlayer crosstalk from another information recording layer;

a distortion correction section correcting the distortion of the target reproduction signal caused by the interlayer crosstalk by gain-adjusting the reproduction signal containing DC components so that the envelope signal becomes constant;

a determination section determining whether the optical information recording medium has plural information recording layers or a single information recording layer on the basis of a reading from the information recording layer; and a controlling section allowing the extraction section and the distortion correction section to operate when it is determined by the determination section that the optical information recording medium has plural information recording layers and for otherwise allowing a signal processing section to perform signal processing without allowing the extraction section and the distortion correction section to operate.

* * * * *